Figure 1:
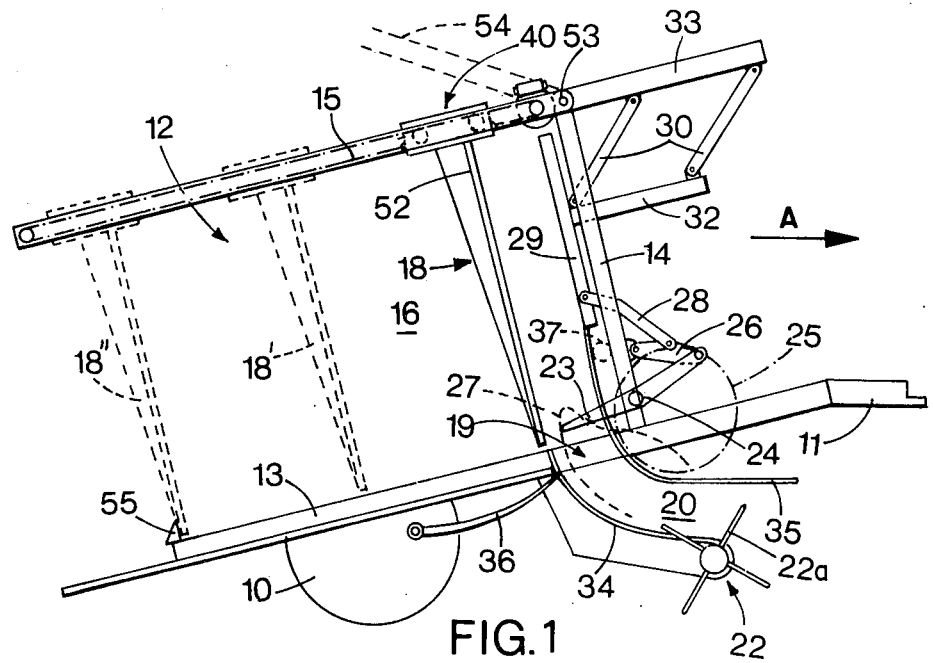

United States Patent [19]

Howard et al.

[11] 4,104,853

[45] Aug. 8, 1978

[54] HAY BALER

[75] Inventors: John Arthur Howard; Bryce Ernest Randall; David Hugh Fleming-Brown, all of Bury St. Edmunds, England

[73] Assignee: Howard Machinery Limited, Bury St. Edmunds, England

[21] Appl. No.: 731,636

[22] Filed: Oct. 12, 1976

[30] Foreign Application Priority Data

Oct. 28, 1975 [GB] United Kingdom ............... 44471/75

[51] Int. Cl.² ............................................ A01D 39/00
[52] U.S. Cl. ..................................... 56/341; 214/82; 214/83.3
[58] Field of Search .................... 56/341; 214/82, 83.3

[56] References Cited

U.S. PATENT DOCUMENTS

| 3,049,256 | 8/1962 | Urban | 214/82 X |
| 3,220,586 | 11/1965 | Gollnick | 214/83.3 X |
| 3,556,324 | 1/1971 | McCarthy | 214/152 |

FOREIGN PATENT DOCUMENTS 1,244,302 8/1971 United Kingdom ...................... 56/341

Primary Examiner—Louis G. Mancene
Assistant Examiner—Daniel J. Leach
Attorney, Agent, or Firm—Wegner, Stellman, McCord, Wiles & Wood

[57] ABSTRACT

A baler for making large sized rectangular bales of agricultural crops, has a bale chamber the size and shape of the bales to be formed. At one end of the chamber the crop is introduced into the chamber by feed means which compresses the crop. A restraining member in the bale chamber is movable from adjacent the inlet towards a position in which the chamber is full so as to define an increasing volume of the chamber accessible to the crop and enable bales of variable, relatively high density to be formed.

The restraining member is moved intermittently by the pressure of the crop in the chamber and after completion of each bale is returned to its initial position. Each bale is bound together when completed and a packing plate is optionally provided to assist in forming the bales.

15 Claims, 4 Drawing Figures

U.S. Patent  Aug. 8, 1978  Sheet 1 of 2  4,104,853

HAY BALER

This invention relates to baling machines and in particular, but not exclusively, to baling machines for making relatively large sized rectangular bales from agricultural crops.

It has already been proposed in British patent specification No. 1,244,302 (U.S. Pat. No. 3,552,109) to provide a baling machine which is able to pick up crops, such as straw and hay, from the ground and form them into large rectangular bound bales which can be mechanically handled thereby inproving the efficiency of transport and handling operations compared with the previous smaller rectangular bales. The large bales produced by this baler are generally relatively less dense than conventional bales and, in at least some cases, it is desirable that a denser bale be formed. Moreover, the bales do not always have uniform density or a consistent shape and it is an object of the invention to provide a baling machine which can make improved large rectangular bales compared with existing machines.

According to the invention a baling machine comprises a mobile frame defining a bale chamber, an inlet opening in the bale chamber, feed means for feeding material to be baled to the inlet opening, and a restraining member constituting one of the walls of the bale chamber and movable between a first position in which the bale chamber is able to accept a relatively small quantity of the material and a second position in which the bale chamber is filled with the material, the restraining member offering a resistance to the movement between the first and second positions so that material entering the chamber is compressed in the chamber, and such movement resulting in an enlargement of the bale chamber space to be occupied by the material.

Preferably the feed means includes packing members which pack the material into the bale chamber and the packing members may include reciprocable packing fingers which operate in a duct along which the material is fed to the inlet opening.

Conveniently the machine comprises a packing plate constituting a wall of the bale chamber lying opposite to the restraining member, the packing plate being reciprocable towards and away from the restraining member to compress material within the chamber and the packing plate is continuously reciprocable as the material is being fed into the chamber. Alternatively the packing plate is intermittently operable to compress successive batches of material against the restraining member.

The restraining member may be supported by and depend from the roof of the chamber and movable from said first position which is adjacent to an end wall of the chamber, to said second position which is remote from said end wall. Preferably the movement of the restraining member between the first and second positions is effected by the pressure of the material being baled on the restraining member.

Figure 2:
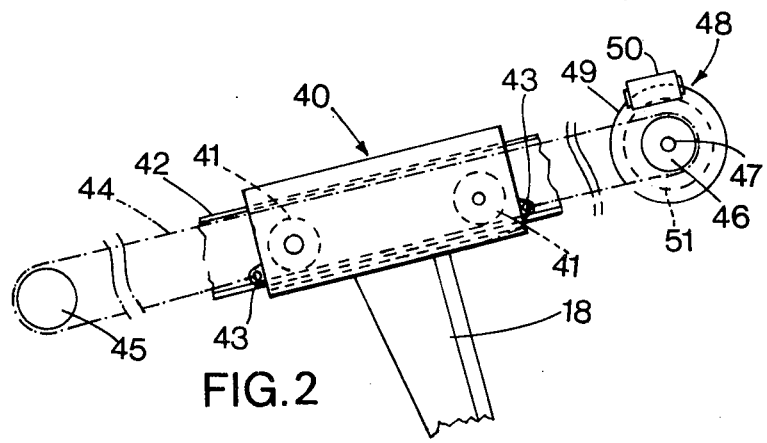
Figure 3:
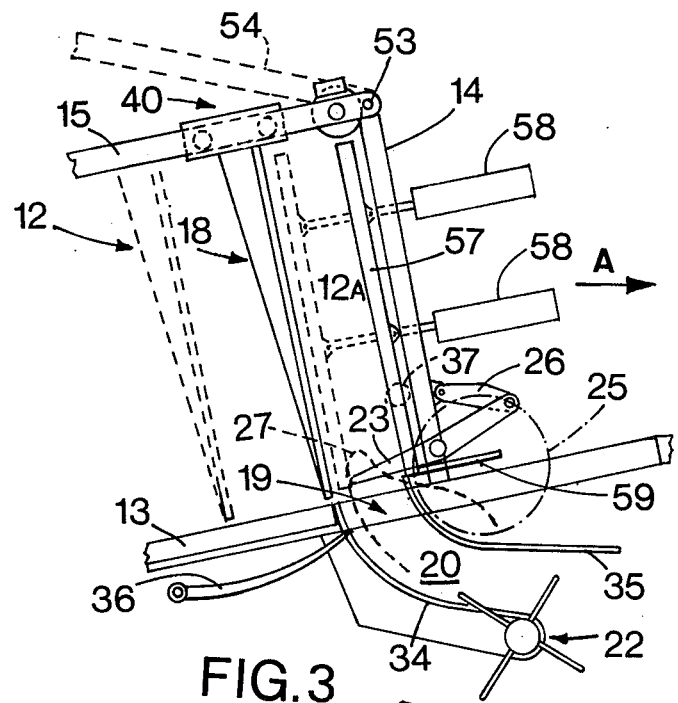
Figure 4:
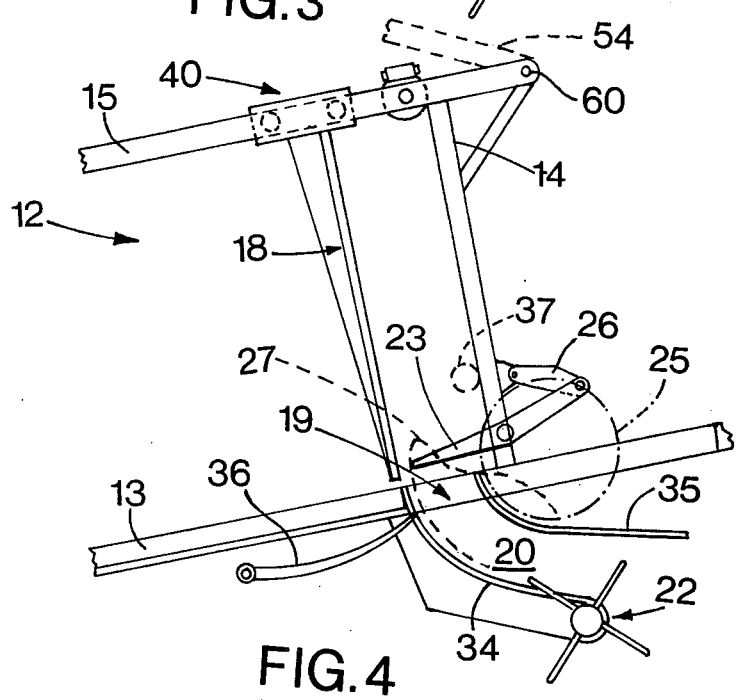

Further features of the invention appear from the following description of various embodiments of the invention given by way of example only and with reference to the drawings in which;

FIG. 1 is a schematic side elevation in vertical section of a baling machine of the invention, FIG. 2 is a side elevation of part of the machine of FIG. 1 to a larger scale, FIG. 3 is a schematic side elevation in vertical section of part of a baling machine illustrating modifications to the machine of FIG. 1, and FIG. 4 is an elevation similar to FIG. 3 showing further modifications.

Referring to the drawings and firstly to FIGS. 1 and 2, a baling machine is shown which is intended to be drawn over the ground by a tractor, by which it is also powered, to pick up and bale material lying on the ground and to discharge complete bales back onto the ground for subsequent use or transportation. The baler of FIG. 1 has as its basis the baling machine described in British patent specification No. 1,244,302 and the parts of the present baler generally common to this known baler will first be described.

The baler of FIG. 1 comprises a mobile frame mounted on a pair of wheels 10 and arranged to be connected by a drawbar 11 to a tractor for towing over the ground. The frame defines a bale chamber 12 constituted by a floor 13, a front end wall 14, a roof 15 and side walls 16. The rear end wall of the chamber 12 is constituted by a restraining member 18 rather than a tailgate as in the previously proposed baler of specification 1,244,302 (U.S. Pat. No. 3,552,109).

At the forward end of the bale chamber 12 with respect to the direction of travel A an inlet opening 19 is formed in the base of the chamber for the entry of crop to be baled. The opening 19 extends across the width of the chamber and is therefore in the form of a slot which communicates with an entry duct 20 leading downwardly and forwardly to a pick-up reel 22, with tines 22a, which picks up the crop from the ground and passes it into the duct. After entering the duct the crop is fed through the inlet opening 19 into the forward end of the chamber 12 by a series of spaced packing fingers 23. The packing fingers 23 are mounted on a shaft 24 which is carried on a rotatable gear wheel 25, and a linkage 26 between the fingers and the front wall 14 ensures that, as the wheel 25 rotates, the fingers follow a packing movement as indicated by the chain line 27.

A further linkage 28 is connected between the linkage 26 and a packing plate 29 located to the rear of the front wall 14 and causes the packing plate 29 to execute a reciprocal movement in the fore and aft direction as the packing fingers 23 are operated. In practice, the fingers 23 and thus the plate 29 are operated continuously as the baler moves forward. The packing plate 29 is supported by a set of linkages 30 connected between an extension 33 of the roof 15 and beams 32 secured to the plate 29. The packing plate 29 extends across the full width of the chamber 12 and downwards from near roof level so that its lower edge is clear of the packing fingers 23, and the plate 29 is formed of vertical bars interconnected by cross members (not shown).

The duct 20 is formed of an upper guide plate 35 and a lower guide plate 34, the upper end of the guide plate 35 extending up into the chamber 12, and the plates 35 and 34 being apertured for the passage of the fingers 23 and pick-up reel tines 22a.

The baler is provided with binding means for binding three lengths of twine around the completed bales and the binding means includes three needles 36 spaced across the chamber adjacent the inlet opening 19 each needle being associated with a knotting mechanism 37 adjacent the front wall 14 whereby, after the completion of each bale needles are moved simultaneously across the inlet opening 19 towards the knotting mechanisms 37 to knot the lengths of twine. The binding means is generally as described in said specification No. 1,244,302.

The restraining member 18 is supported by the roof 15 on two carriages 40, as seen in more detail in FIG. 2, and the member 18 extends downwards from the roof to closely adjacent the floor 13. The carriages 40 are spaced across the member 18 and each include rollers 41 by which the carriages move along beams 42 forming part of the roof. The carriages 40 also include connectors 43 by which the ends of chains 44 are connected to the carriages. The chains 44 pass in the fore and aft direction and they each extend around a sprocket 45 at the rear end of the roof end a sprocket 46 at the forward end. The sprockets 45 are freely rotatable whereas the sprockets 46 are mounted on a common shaft 47 whose rotation is controlled by brake means 48 in the form of a disc brake including a disc 49 and a brake assembly 50 which engages the disc 49 to provide a braking effect when the member 18 is moved in the rearward direction. The shaft 47 is also connected to a motor 51, preferably a hydraulic motor, by which the shaft is driven when the member 18 is to be moved in the forward direction.

The restraining member 18 is formed of upright bars 52 interconnected by cross members and is connected to the underside of the carriages 40.

The roof 15 is connected to the front wall 14 by a horizontal pivot 53 by which the roof 15 and restraining member 18 can be pivoted upwards, as shown by the chain lines 54, when discharge of a completed bale is to take place.

Operation of the baling machine of FIGS. 1 and 2 is as follows. The machine is drawn over the ground on which crop to be baled is lying and the crop is lifted and passed into the duct 20 by the pick - up reel 22, which is of known form. The packing fingers 23 feed the crop along the duct 20 to the inlet opening 19 and into the bale chamber 12. At the beginning of the operation of filling the chamber 12 with the crop the restraining member 18 is at the position shown by full lines in FIG. 1 so that the crop entering is packed into the space between the member 18 and the packing plate 29 by the action of the fingers 23 and the packing plate 29. Compression of the material takes place during the feeding action and such compression is increased as the space becomes filled. The compression may be high enough to cause, for example, a straw crop to reach a density of about 170 kilograms per cubic meter but, as will be explained, the density reached can be selected to be according to the eventual desired density of the finished bale.

After the space between the member 18 and the plate 29 has been filled to the desired density the member 18 is moved in the rearwards direction. This is achieved by setting the brake means 48 to give a braking effect corresponding to the desired density so that when the pressure on the member 18 overcomes the braking effect the member 18 is moved rearwardly under the effect of such pressure to relieve the pressure. During such movement the feed of crop continues so that the member 18 is gradually moved backwards through position 18' until it reaches the rearmost position 18" at which the chamber 12 is full. In the position 18" the lower end of the member abuts stops 55, and the binding operation takes place by operation of the needles 36 to cause the knotting mechanisms 37 to tie the ends of the binding twine.

When a bale has been bound the roof 15 of the chamber 12 is raised with the member 18 by ram means (not shown) to release the bale so that it slides rearwardly over the sloping floor 13 of the chamber. As soon as the bale meets the ground it is quickly drawn out of the chamber so that the roof may be lowered. When the bale is released the motor 51 is operated to return the member 18 to its most forward position. During discharge of a bale the baler continues to move forward and to feed material into the chamber 12, such material being constrained in its rearward movement by the baling twine which initially lies across the inlet opening and being consolidated by the member 18 on its return to the forward position. It will be appreciated that during forward movement of the restraining member 18 the brake means 48 is released and only reapplied when the member 18 has resumed its forward position where it again provides the function of restraining rearward movement of the crop.

As an alternative to the restraining member moving rearwardly according to a predetermined setting of the brake means, the brake means may be arranged to be released periodically according to a predetermined pressure being reached in the chamber or according to a predetermined time setting. Moreover the motor 51 may be reversible so that the member 18 may be driven rearwardly rather than relying on the pressure of the crop in the chamber alone to push the member 18 back. In such arrangements the member 18 will move backwards intermittently in predetermined increments.

The embodiment of FIG. 3, to which we now refer, is similar in most respects to that of FIGS. 1 and 2 except that in this case the continuously reciprocating packing plate 29 is replaced by a packing plate 57 which is reciprocable intermittently by hydraulic rams 58. The plate 57 constitutes the front end wall of the chamber and is operated to move rearwards when a vertical slice or column 12A of the chamber 12 has been filled and it is required to further compress the column and move it rearwardly. The lower edge of the plate 57 is fitted with a forwardly extending plate 59 which extends over the inlet opening 19 when the plate 57 moves rearwardly to prevent material passing up the duct from entering the chamber 12 until the plate 57 is returned to its forward position. In other respects the apparatus of FIG. 3 is constructed and operates in accordance with the embodiment of FIGS. 1 and 2.

It will be appreciated that the plate 57 serves the function not only of compressing each new column 12A of material after it enters the chamber but also of urging the member 18 backwards and, at the completion of each bale, of pushing the bale out of the chamber when the roof 15 and member 18 are raised. The rams 58 may be powered by fluid from the tractor hydraulic supply and operated automatically in predetermined sequence or manually as soon as each column 12A is completed.

As an additional feature there may be provided holding means (not shown) for holding the material in the chamber after each operation of the plate 57 to more readily keep the space above the opening 19 clear to receive incoming material.

Referring now to FIG. 4 a further embodiment is shown which is similar to that of FIGS. 1 and 2 and FIG. 3, except that, in this case, no packing plate is provided, the material in the chamber being compressed between the member 18 and the front wall 14 by the action of the packing fingers 23 alone. In other respects the machine of FIG. 4 operates as for the previous embodiments, the member 18 moving backwards as the pressure in the bale increases.

In the FIG. 4 embodiment it will be seen that the roof 15 pivots upwards about a pivot 60 located in front of the front wall 14 to reduce the pivoting action needed to effect discharge of the bales.

As an optional feature of each of the embodiments, the restraining member 18 may be moved forward a short distance after reaching the rearmost position to assist in consolidating the completed bale before the binding operation takes place.

As further alternatives to the described mode of operation of the restraining member, its retraction can take place after a predetermined distance has been travelled over the ground by the baler or when the packing mechanism is placed under a predetermined torque.

Moreover, the restraining member may incorporate a pivot at its upper end adjacent the carriages 40 whereby discharge of bales may be achieved by pivoting of the member about the pivot rather than by raising up the roof, as previously described.

As a further alternative the restraining member may be mounted on the floor of the chamber for rearward movement and be pivotable downwardly to discharge the bales. In a further arrangement the restraining member is mounted on a side wall 16 of the chamber and is pivotable sideways or the member is formed in two parts each mounted on a respective side wall.

It will be appreciated that the compression achieved during the feed of material into the bale chamber can readily be varied. Such variation in the density of the bale may be useful in cases where the eventual density of the bale is required to be varied, as for example in the case where moist material is being baled which needs to be of a lower density than the equivalent dry material.

The baling machine of the invention conveniently makes bales having the dimensions of 2.5 meters by 1.5 meters by 1.5 meters and a density of between 100 and 240 kilograms per cubic meter.

What we claim as our invention and desire to secure by Letters of Patent of the United States is:

1. A baling machine comprising a mobile frame defining a bale chamber, an inlet opening at the forward end of the lower wall of the chamber, feed means for picking material to be baled from off the ground and feeding it to the inlet opening, an outlet opening at the rear end of the bale chamber through which a completed bale is discharged onto the ground while the machine is traveling, and restraining means constituting a rearward part of the bale chamber and movable between a first position in which the bale chamber is able to accept a relatively small quantity of the material and a second position in which the bale chamber is filled with the material, the restraining means offering a resistance to the movement between the first and second positions so that material entering the chamber is compressed in the chamber, and such movement resulting in an enlargement of the bale chamber space to be occupied by the material, the restraining means on reaching the second position being movable out of the path of the baled material to enable the completed bale to be discharged through the outlet opening.

2. A baling machine according to claim 1 wherein the restraining means is movable upwardly on reaching said second position.

3. A baling machine according to claim 1 wherein the restraining means is a restraining member attached for movement relative to a roof of the bale chamber between said first and second positions, the roof and the restraining member being movable simultaneously upwardly about a horizontal axis disposed at the forward end of the bale chamber when in said second position.

4. A baling machine according to claim 1 comprising a duct leading to the inlet opening, the feed means including pick up means for picking up material from the ground and passing it in to the duct and packing members which operate in the duct to pack the material into the bale chamber.

5. A baling machine according to claim 1 comprising a packing plate constituting a front wall of the bale chamber, the packing plate being reciprocable towards and away from the restraining means to compress material within the bale chamber.

6. A baling machine according to claim 5 wherein the packing plate is continuously reciprocable as the material is being fed into the chamber.

7. A baling machine according to claim 5 wherein the packing plate is intermittently operable to compress successive batches of material against the restraining member.

8. A baling machine according to claim 1 wherein the bale chamber is generally rectangular and has a roof, a floor, opposite side walls and two end walls, one of the end walls being constituted by the restraining means.

9. A baling machine according to claim 8 wherein the other of the end walls is constituted by a reciprocable packing plate which lies adjacent the inlet opening.

10. A baling machine according to claim 8 wherein the restraining means is supported by and depends from the roof and is movable from said first position which is adjacent the other of the end walls, to said second position which is remote from said other of the end walls.

11. A baling machine according to claim 1 wherein the movement of the restraining means between the first and second positions is effected by the pressure of the material being baled on the restraining means.

12. A baling machine according to claim 11 wherein the movement between the first and second positions is resisted by brake means.

13. A baling machine according to claim 1 wherein the movement of the restraining member between the second and first positions is powered by drive means.

14. A baling machine according to claim 1 comprising binding means for binding together material collected in the bale chamber prior to discharge from the chamber.

15. A baling machine according to claim 14 wherein the binding means includes at least one knotting mechanism and an associated needle located adjacent and movable across the inlet opening to the knotting mechanism whereby loops of binding material are secured around the bales.

* * * * *